Feb. 26, 1935.       H. PALM        1,992,502
METHOD AND MEANS FOR REGULATING LIQUIDS
Filed Oct. 14, 1932    3 Sheets-Sheet 1
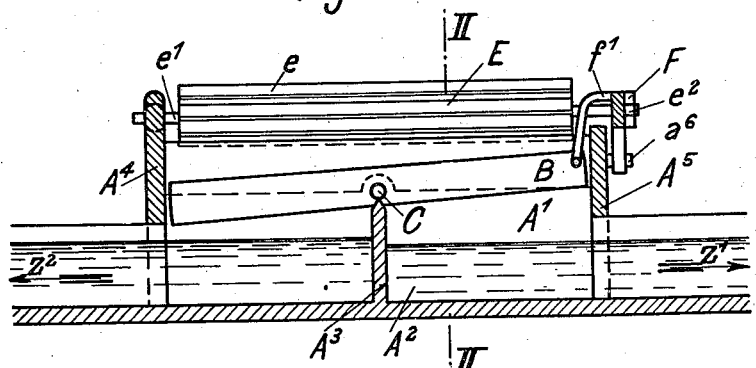
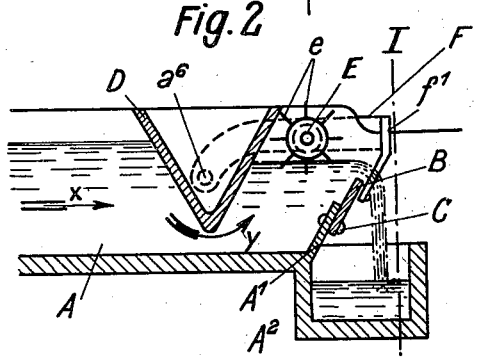
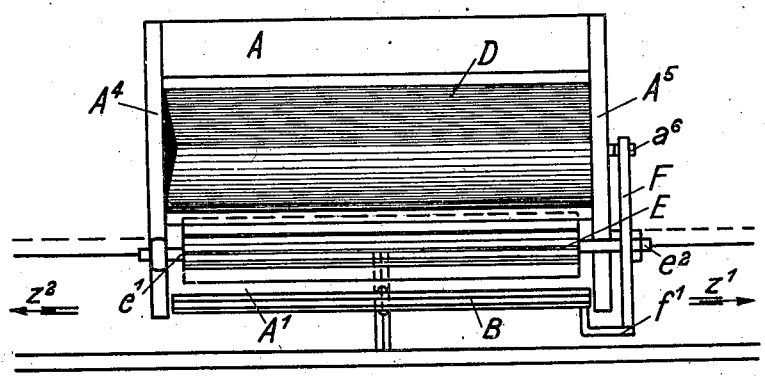
Hermann Palm
by C. P. Goepel
his attorney.

Feb. 26, 1935.                H. PALM                  1,992,502
                METHOD AND MEANS FOR REGULATING LIQUIDS
                Filed Oct. 14, 1932      3 Sheets-Sheet 2
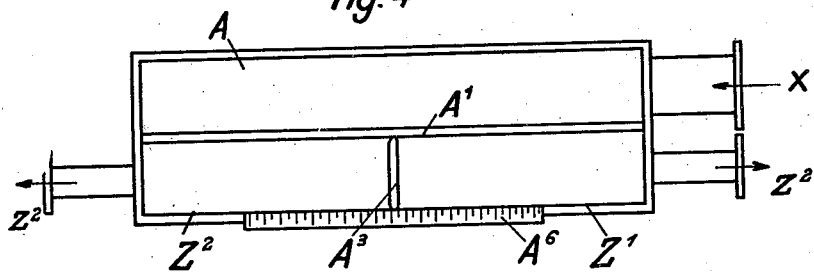
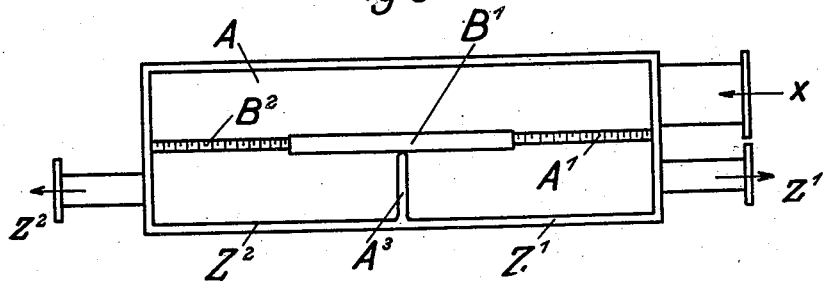
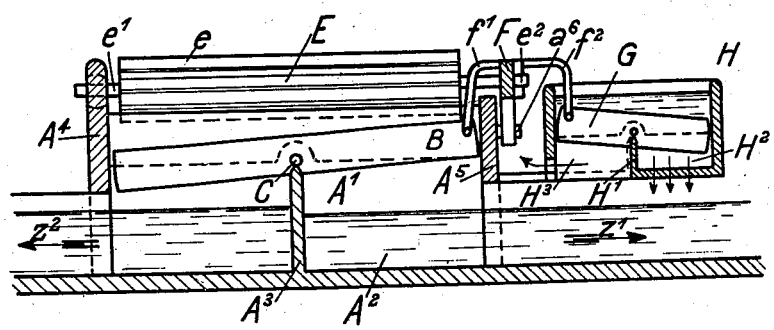
Hermann Palm
by C. P. Goepel
his attorney.

Feb. 26, 1935. H. PALM 1,992,502
METHOD AND MEANS FOR REGULATING LIQUIDS
Filed Oct. 14, 1932   3 Sheets-Sheet 3

Hermann Palm
by C. P. Goepel
attorney.

Patented Feb. 26, 1935

1,992,502

UNITED STATES PATENT OFFICE 1,992,502

METHOD AND MEANS FOR REGULATING LIQUIDS

Hermann Palm, Neukochen, near Unterkochen, Germany, assignor to J. M. Voith, Heidenheim-on-the-Brenz, Germany, a copartnership composed of Walther Voith, St. Polten, Austria, Herman Voith, Heidenheim - on - the - Brenz, Germany, and Hanns Voith, Heidenheim-on-the-Brenz, Germany Application October 14, 1932, Serial No. 637,860
In Germany October 14, 1931

15 Claims. (Cl. 92—46)

This invention relates to a method and means for regulating liquids, and has for its general object and purpose to automatically control and regulate the flow of a liquid or a liquid material mixture from a supply stream into a conduit, whereby such liquid or mixture is discharged in constantly uniform quantity or volume into the conduit and conveyed thereby to the point of utilization.

My invention is intended more particularly for use in connection with Fourdrinier paper-making machines for the purpose of preparing the paper pulp stock, and therefore has as one of its important objects to provide a method and means whereby a constantly uniform ratio may be maintained between the water and the fiber or cellulose material which is supplied to the Fourdrinier wire.

It is a more particular object of my invention to provide mechanism for the above purpose characterized by the provision of means movably arranged between the supply stream of the liquid mixture and the receiving conduit and a float member movable in response to variations in concentration of the supply mixture, and operatively connected with said means to actuate the latter and thereby insure a uniform supply of the mixture to said conduit regardless of concentration.

Another object of the invention is to provide auxiliary means also automatically actuated by the float member for controlling the supply of additional water to said conduit and thereby maintain a constantly uniform ratio of water and fiber material flowing through said conduit.

Additional objects of the invention are to provide said movable control means, in the form of a baffle member pivotally mounted intermediate of its ends, together with means dividing said conduit into two sections, one of which receives a part of the liquid mixture from the supply stream to be conveyed to the point of utilization, while the other conduit section receives another part of said mixture to be returned therefrom to the supply stream. In one embodiment of the invention, I also provide an adjustable means associated with said movable baffle for varying the relative quantities of the liquid mixture which are delivered from the supply stream into the respective conduit sections.

With the above and other objects in view, the invention consists in the improved method and means for regulating liquids, and in the form, construction and arrangement of the apparatus employed as will be hereinafter more fully described, illustrated in the accompanying drawings, and subsequently incorporated in the subjoined claims.

In the drawings wherein I have disclosed several simple and practical embodiments of the invention, and in which similar reference characters designate corresponding parts throughout the several views,—

Figure 1 is a vertical sectional view taken substantially on the line 1—1 of Fig. 2, and illustrating one form of my present improvements;

Fig. 2 is a vertical sectional view taken substantially on the line 2—2 of Fig. 1;

Fig. 3 is a top plan view;

Fig. 4 is a top plan view of a part of the apparatus showing an adjustable partition or division plate for varying the volume of liquid discharge into the two trough sections;

Fig. 5 is a similar plan view of a modification of the device shown in Fig. 4;

Fig. 6 is a view similar to Fig. 1 illustrating an auxiliary device for automatically controlling the supply of additional water to one of the conduit sections in accordance with the concentration of fiber or cellulose material in the main liquid stream.

Figure 8:
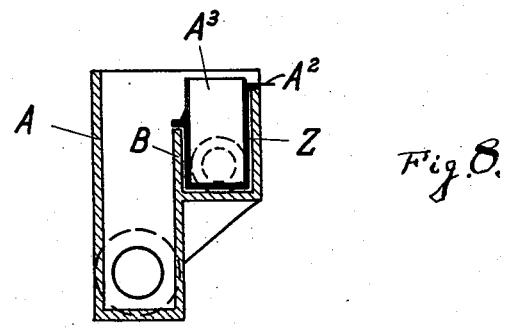
Fig. 8 is a transverse sectional view taken on the line 8—8 of Fig. 4.
Figure 9:
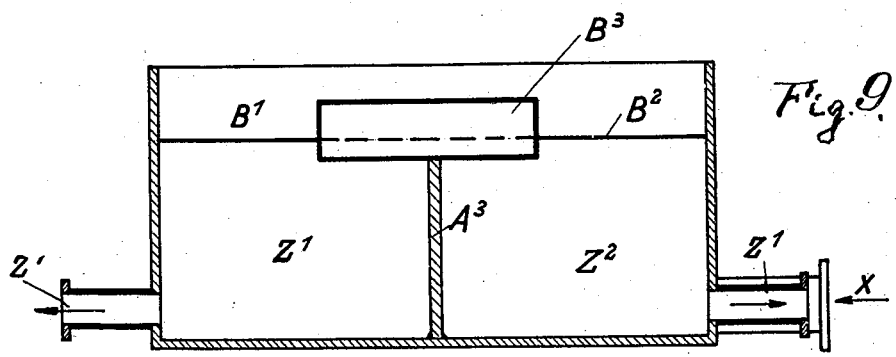
Fig. 9 is a longitudinal sectional view taken substantially on the line 9—9 of Fig. 5.

Referring in detail to the drawings, the liquid or liquid material mixture is supplied to chamber or supply section A by a pump or other suitable means. At one end of this chamber, a wall $A^1$ projects upwardly from the bottom thereof, and may be obliquely inclined as indicated in Fig. 2 of the drawings over the upper open side of the conduit structure $A^2$ which may be made integral with the chamber A. This conduit structure or discharge section is provided with a transverse division wall or partition $A^3$ dividing the same into the two sections $Z^1$ and $Z^2$. The section $Z^1$ (constant flow compartment) leads to the point of utilization of the liquid material, while the material entering the conduit section $Z^2$ (variable flow compartment) is returned to the pump, and thereby returned to the chamber A.

Within the chamber A and in spaced parallel relation to the wall $A^1$, a V shaped web D extends across said chamber. The liquid material flowing in the direction indicated by the arrow X strikes one of the inclined walls of said web and is directed downwardly thereby between the lower end of the web and the bottom wall of the chamber, and then upwardly as indicated by the arrow Y into the space between the other side wall of said web, and the wall $A^1$. Within this space, a cylindrical float E is mouned to extend across said chamber on the surface of the liquid, said float being preferably provided with a plurality of circumferentially spaced blades $e$ projecting radially from the periphery thereof.

At one of its ends, the float E has an axis $e^1$ journalled in a suitable bearing mounted to pivot or rock in the wall $A^4$ of the chamber, A. At the opposite end, the float E has the axis $e^2$ which is journalled in an arm F intermediate of its ends, said arm being pivotally supported at one of its ends as at $a^6$ on the opposite wall $A^5$ of the tank A.

Upon the wall $A^1$ at its upper edge, a baffle member B is pivoted intermediate of its ends as at C, and extends between the walls $A^4$ and $A^5$ over the two conduit sections $Z^1$ and $Z^2$. The end of this baffle above the conduit section $Z^1$ is operatively connected by the part $f^1$ to the other end of the arm F.

It will be evident from the above description, that the baffle B extending above the upper edge of wall A holds back a part of the liquid contained in chamber A, the volume or quantity of the liquid flowing over this baffle into the conduit section $Z^1$ being constant, while the quantity which flows into the conduit section $Z^2$ is variable. This is due to the fact, that as the quantity of liquid in chamber A increases, the float E is raised, thereby rocking the end porton of baffle B extending over conduit section $Z^1$ upwardly through its connections with the arm F, so that said part of the baffle member is caused to enter the liquid stream. Contrariwise, as the volume of liquid in chamber A decreases and float E moves downwardly, said end portion of the baffle member is lowered out of the liquid stream. There is thus maintained a constant quantity of the liquid discharged into conduit section $Z^1$ regardless of variations in the liquid level in chamber A.

In the use of the device shown in Figs. 1, 2 and 3 for the regulation of a fiber stock water mixture to maintain a constant absolute amount of the fibers in the mixture in a given period of time, it is of importance that the dam or web D shall penetrate the incoming stream from above, so as to divert said stream as indicated by the arrows, and thus cause an upward current beneath the float E. If a constant fiber content in the mixture is to be maintained, the static head alone is not sufficient inasmuch as such head would not be influenced by variations in the amount of fibers contained in the mixture. As the quantity of water in the stock stream increases relative to the fiber content, greater dispersion of the stock fibers takes place, resulting in decreased stock concentration with a proportionate decrease in consistency or viscosity of the pulp stock. However, as the fiber content changes, the viscosity of the mixture increases with such increase in the fiber content. This creates a flow resistance due to increase in wall friction, which accounts for the necessity in the use of previous regulating devices of this kind for keeping the fiber content of the mixture constant. For the regulation of liquids not containing such fibers, the dam or web D may be eliminated.

In maintaining a constant quantity of fibers in the mixture discharged into the conduit section $Z^1$, when the total quantity or volume of the mixture in chamber A is in excess of the requirements, the float E so functions that in addition to upward movement thereof by the rise of liquid level, any increase in the fiber content of the mixture will, due to the upward flow between dam E and wall $A^1$, also cause a dynamic rise of the float. Thus one adjustment component of the movable baffle B corresponds to the increase in the fiber content of the mixture. If, for instance, the total quantity of incoming liquid remains constant while only the specific amount of fibers contained in the mixture increases, the float, without the static pressure causing a rise thereof, will nevertheless be moved upwards by the increased force of the fiber particles, and as previously stated, the upper edge of baffle B will be moved into the overflowing stream to an extent which accurately corresponds with the increase in fiber content, thereby diminishing the overflow so that the quantity of liquid entering into conduit section $Z^1$ will vary, but the amount of fiber particles will remain constantly uniform. This is absolutely requisite in the manufacture of paper for certain purposes.

For the purpose above described, the blades $e$ on the float have proved to be of decided advantage. These blades offer increased resistance to the movement of fiber particles floating on the current than would a smooth float body and they also cause the float E to be kept in regular rotation by the force of the current. This favors a desired uniformity of the stock current which passes underneath the float and prevents clinging or adherence to the float of the fibers which would occur if the float is stationary.

Another advantage of my invention in addition to its great simplicity and dependability, resides in the fact that the automatic quantity regulation of the discharge from chamber A into conduit section $Z^1$ occurs immediately adjacent to the point in the stock current, at which the determination of the fiber content in the overflow is automatically accomplished through the impulse exerted on the float E, and unlike other regulating devices, this impulse is produced by the utilization of the entire width of the incoming stock current instead of only a part thereof. Practical tests have shown that when the float E is in the form of a sheet metal cylinder, the upward pressure and rise are amply sufficient to directly cause the movement of the baffle member B without necessitating resort to an intermediate or indirect means such as a servo-motor. Thus, the present invention accomplishes the desired purpose in a much simpler manner than other regulating devices heretofore suggested, and functions in a more reliable and accurate manner.

If in addition to maintaining a constant supply of fiber to the trough $Z^1$ from the main stream, it is also desired to maintain a constant concentration of the stock in chamber A, the auxiliary device shown in Fig. 6 is employed. The use of this auxiliary device presupposes a substantially uniform flow of stock to the chamber A whereby the rise and fall of float E is caused substantially entirely by changes in the fiber concentration of the stock. This uniform flow of stock into chamber A may occur naturally or may be positively controlled for example by the use of the device illustrated in Figs. 1 to 3 in the stream of stock flowing to chamber A. With such even flow of stock to chamber A, the use of the device illustrated in Fig. 6 provides a uniform stream of uniform fiber content going to the machine. Thus, the lever F is connected by means of a second rod $f_2$ with the movable baffle or weir G, which is mounted and arranged in the same manner as the previously referred to baffle B. This baffle G provides a movable dam mounted in the trough H which receives water or other liquid maintained therein at a constant level. A partition wall $H^1$ in line with the fulcrum of baffle G separates the trough into the two sections $H^2$ and $H^3$. The water entering the section $H^2$ is added to the main stream of stock supplied to chamber A. The arrangement is such that the baffle G which regulates the amount of water entering trough section $H^2$ rises with the increase in consistency of the stock, the flow of which is regulated and controlled by the main baffle or weir B, by the upward movement of the part of the baffle G extending over the trough section $H^2$. With the properly predetermined quantity of water passing over the baffle G into trough section $H^2$ with each variation in consistency of the stock in the main chamber A, the necessary and proper amount of water will be supplied from the trough section $H^2$ to the stock mixture in chamber A corresponding to the amount of water which is retarded or held back by baffle B from flowing into the conduit section $Z^1$. In this manner, the consistency of the stock mixture is maintained constant.

The proper regulation of the quantity of fiber is very important in paper manufacture. Any appreciable time interval between the discovery of a wrong fiber mixture and its undesirable effects in the paper produced by the machine, results in a substantial length of paper sheet being of improved weight, and prior regulating devices of this kind have not to my knowledge been successful in preventing such weight fluctuations. This difficulty is enhanced by the possibility that such weight fluctuations may be in that part of the paper sheet on the inside of the roll into which the paper is wound and which therefore cannot be detected by samples taken at the beginning or the end of the roll. These weight fluctuations often cause great trouble in the use of the paper, as for instance, on printing presses. This difficulty is entirely avoided by means of the present invention.

A special advantage of the present invention resides in the fact that the regulation of the stream of stock takes place immediately behind the place in the stream at which the impulse setting such regulation in motion, occurs. Thus, the weir B acts to decrease or increase the flow of the very portion of the stream whose characteristics gave rise to the action of the weir. The same also is true of the device of Fig. 6 in which, for example, the water is added to that portion of the stream which has been restricted due to increased consistency.

For the purpose of further regulating the quantity of liquid flowing from the stream in chamber A into conduit section $Z^1$, I may provide suitable means for adjustably positioning the partition $A^3$ with respect to a suitable scale $A^6$ extending lengthwise of the trough sections $Z^1$, $Z^2$, so that by adjusting this partition horizontally in one direction, a greater quantity of the liquid will be discharged into the trough section $Z^1$, and by moving said partition in the opposite direction, a less quantity will be discharged into said trough section per unit of time.

Figure 7:
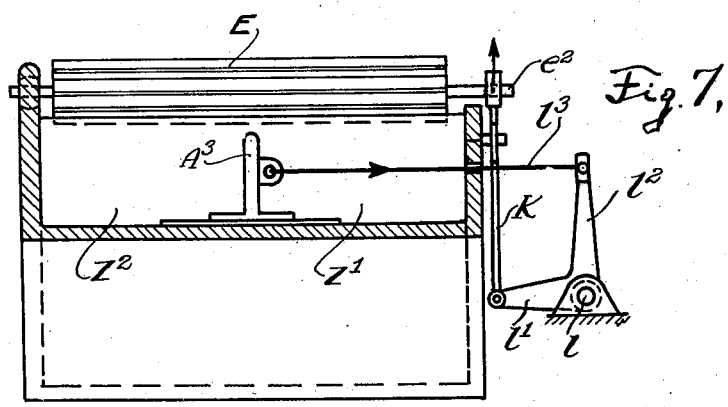
Fig. 7 is a longitudinal sectional view illustrating means for automatically adjusting the slidable partition wall between the trough section Z—1, Z—2 of Fig. 4.

If desired, I may provide means for automatically adjusting the partition $A^3$ in accordance with the changes in level of the liquid mixture in the chamber A. Thus, as shown in Fig. 7 of the drawings, to the end shaft $e^2$ of the float $e$, the upper end of a rod $k$ is connected, the lower end of said rod being pivotally connected to the horizontal arm $l^1$ of a bell crank lever fulcrumed upon a suitable stationary support, as indicated at $l$. The other vertically extending arm $l^2$ of this lever is connected by means of the rod $l^3$ with the slidable partition member $A^3$. It will be evident that by means of this operating connection between the float and the movable partition, possible variations in the total quantity of liquid entering trough A will not affect the basic adjustment as determined for the particular operating condition, and also acts to maintain an equal level of the liquid in chamber A.

In Fig. 5, I have shown a modification in which the partition $A^3$ is fixed, and a member $B^1$ is adjustably mounted upon the wall $A^1$ which may be provided with a suitable scale indicated at $B^2$. Of course, it is understood that in conjunction with each of these adjustable devices shown in Figs. 4 and 5, the pivoted baffle member B above referred to may be employed. The adjustable members $A^3$ or $B^1$ can also be operatively connected with the float E for automatic actuation so as to properly vary the position of said member with respect to the central pivot or fulcrum of the baffle B in accordance with variations in the quantity of liquid in chamber A.

I have herein disclosed an example of apparatus which has been found to be entirely practical. It will be evident, however, that other adjustable flow regulating means embodying the principle of the present invention such as gates, valves, etc. controlled by the float member E or its equivalent may be substituted for the pivoted baffles B and G.

From the foregoing description considered in connection with the accompanying drawings, the construction, manner of operation and several advantages of my present invention will be fully understood. It will be seen that by means of the apparatus herein disclosed, I am enabled not only to maintain a constant uniform discharge of liquid into the supply conduit regardless of variations in the liquid supply level, but in controlling or regulating a mixture of water and fiber or other solid material, a uniform ratio of water and fiber in the mixture supplied at the point of utilization is constantly maintained. Therefore, it is apparent that my invention is particularly desirable for use in connection with the preparation of the stock to be supplied to paper-making machines.

I have herein disclosed several simple and practical embodiments of my invention, but it is nevertheless to be understood that the essential features thereof may also be incorporated in various other alternative structural forms of apparatus, and I accordingly reserve the privilege of making all such legitimate changes therein as may be fairly embodied within the spirit and scope of the appended claims.

I claim:

1. In apparatus of the kind described, two conduit sections, means for directing a stream of liquid material to said conduit sections, a movable member common to both conduit sections operatively controlled by variations in level of the liquid stream to cause the discharge flow of a part of said stream in constant quantity into one of said conduit sections, and the discharge of the remaining part of said stream in variable quantities into the other conduit section, and additional means also operatively controlled by variations in level of the liquid stream for proportionately varying the relative volumes of the stream parts received in the respective conduit sections.

2. In apparatus of the kind described, two conduit sections, means for directing a stream of liquid material to said conduit sections, a movable discharge control member common to both of said conduit sections, means operatively influenced by variations in level of the liquid stream and cooperating with said member to actuate the latter, and additional means connected with and actuated by said last named means for proportionately varying the relative volumes of the stream parts received in the respective conduit sections.

3. In apparatus for regulating the supply of paper stock to paper-making machines, a conduit divided by a vertical transverse wall into two sections, one of said conduit sections supplying the stock material to the paper machine, means for directing a stream of stock material in variable fiber concentration to said conduit sections, a baffle member pivotally mounted upon said separating wall, means connected with said baffle member operatively influenced by variations in fiber concentration of the stock stream to actuate said member and cause a discharge flow of a part of said stock stream in constant fiber quantity into the conduit section for supplying the paper machine, and the remaining part of said stock stream in variable fiber quantity into the other conduit section to be returned therefrom to the stock stream, and means for automatically controlling the supply of additional water to the stream in the machine conduit section in proportion to the increase of fiber concentration in said stream.

4. In an apparatus for controlling the flow of liquids wherein a float is employed as actuating means, the improvement which consists in a float rotatable about its axis and adapted to be maintained in rotation by the flow of the liquid.

5. The apparatus of claim 4 wherein the float is supplied with radial vanes.

6. An apparatus for producing a regulated flow of liquid from a source of variable supply, comprising a conduit connected to said source of supply, a weir dividing said conduit into a supply section and a discharge section, a vertical wall dividing said discharge section into a constant-flow compartment and a variable-flow compartment, an elongated baffle member controlling the discharge over said weir mounted at the top of said weir and pivoted at a point in the neighborhood of said vertical wall, and an elongated float pivoted at one end in said supply section extending parallel to and in the immediate neighborhood of said weir, the free end of said float being connected to the adjacent end of said baffle member and serving to control the position of said member in accordance with variations in the supply and density of said liquid.

7. The apparatus of claim 6 wherein the supply of fluid is directed against the bottom of said float thereby imparting a dynamic thrust thereto.

8. The apparatus of claim 6 wherein the float is a rotating roller.

9. The apparatus of claim 6 wherein said vertical wall is movable.

10. The apparatus of claim 6 in which said vertical wall is movable and wherein the position of said vertical wall is determined by the position of said float.

11. The apparatus of claim 6 wherein the float also controls an addition of water to said constant-flow section.

12. An apparatus for regulating the supply of paper stock to paper making machines, comprising a conduit, means for directing a stream of stock material in variable supply and fibre content to said conduit, an elongated weir dividing said conduit into a supply section and a discharge section, a vertical wall dividing said discharge section into a constant-flow compartment and a variable-flow compartment, an elongated baffle member pivotally mounted at the top of said weir in the neighborhood of said vertical wall serving to control the flow of liquid over said weir, an elongated float mounted in said supply section parallel to and adjacent said weir and serving to control the position of said baffle member, and a transverse baffle mounted in said supply section in a position serving to direct the flow of said stock material against the bottom of said float thereby imparting a dynamic thrust thereto, whereby the stock discharged over said baffle member into said constant-flow compartment is controlled to a constant absolute fibre content.

13. The apparatus of claim 12 wherein the said float also controls a flow of water into said constant-flow compartment thereby producing a flow of stock material of constant volume as well as of constant fibre content.

14. In an apparatus for regulating the supply of paper stock to paper making machines, a weir discharging paper stock into a constant-flow compartment and a variable-flow compartment, a pivoted baffle member surmounting said weir and controlling the relative quantities of stock discharged into said compartments, and a movable wall separating said compartments; the position of said wall and the position of said baffle member being controlled by means of a float positioned on the supply side of said weir.

15. In an apparatus for regulating the supply of paper stock to paper making machines, a weir discharging paper stock into a constant-flow compartment and a variable-flow compartment, a pivoted baffle member surmounting said weir and controlling the relative quantities of stock discharged into said compartments, a second weir discharging water into said constant-flow compartment and into a water return compartment, a second pivoted baffle member surmounting said second weir and controlling the relative quantities of water discharged into said compartments; the positions of the two said baffle members being controlled by means of a float positioned on the supply side of said weir discharging said paper stock.

HERMANN PALM.